United States Patent
Ge et al.

(10) Patent No.: US 8,629,664 B2
(45) Date of Patent: Jan. 14, 2014

(54) MULTI-PATH CONSTANT CURRENT DRIVING CIRCUIT

(75) Inventors: Liang'an Ge, Hangzhou (CN); Xiaoli Yao, Hangzhou (CN); Guichao Hua, Hangzhou (CN); Xinke Wu, Hangzhou (CN); Lijun Ren, Hangzhou (CN)

(73) Assignee: Inventronics (Hangzhou), Inc., Hangzhou (CN)

( * ) Notice: Subject to any disclaimer, the term of this patent is extended or adjusted under 35 U.S.C. 154(b) by 57 days.

(21) Appl. No.: 13/511,059

(22) PCT Filed: Nov. 15, 2010

(86) PCT No.: PCT/CN2010/078714
§ 371 (c)(1),
(2), (4) Date: May 21, 2012

(87) PCT Pub. No.: WO2011/060700
PCT Pub. Date: May 26, 2011

(65) Prior Publication Data
US 2012/0274291 A1    Nov. 1, 2012

(30) Foreign Application Priority Data

Nov. 21, 2009  (CN) .......................... 2009 1 0225966
Nov. 21, 2009  (CN) .......................... 2009 2 0273352

(51) Int. Cl.
*H02M 3/24*    (2006.01)
*G05F 1/14*    (2006.01)

(52) U.S. Cl.
USPC ................ 323/267; 323/255; 363/16; 363/69

(58) Field of Classification Search
USPC ................ 323/247, 255, 259, 267, 340, 344; 363/16–28, 69
See application file for complete search history.

(56) References Cited

U.S. PATENT DOCUMENTS 3,016,491 A * 1/1962 Morse ............................ 327/11
4,562,338 A   12/1985 Okami
(Continued)

FOREIGN PATENT DOCUMENTS

CN    2044477 U    9/1989
CN    2082947 U    8/1991
(Continued)

OTHER PUBLICATIONS

International Search Report and Written Opinion for PCT/CN2010/078714, ISA/CN, mailed Feb. 24, 2011.
International Search Report and Written Opinion for PCT/CN2010/078716, ISA/CN, mailed Feb. 24, 2011.

*Primary Examiner* — Jessica Han
(74) *Attorney, Agent, or Firm* — Harness, Dickey & Pierce, P.L.C.

(57) ABSTRACT

A multi-path constant current drive circuit includes a DC/AC converter, a main transformer and at least two rectifying and filtering units. The main transformer includes at least one assistant side winding with a tap; together with the assistant side winding of the main transformer, each of the at least two rectifying and filtering units respectively forms a power supply loop; each power supply loop includes a first rectifying loop and a second rectifying loop, which are relatively used for the rectification of the positive and the negative half-cycle alternating voltage; a current-equalizing transformer is arranged between the adjacent first power supply loop and second power supply loop, the windings of the current-equalizing transformer are respectively in the rectifying loops contained in the first power supply loop and the second power supply loop, thus realizing the current equalization between the different rectifying loops in which the adjacent rectifying and filtering units are contained. The multi-path constant current drive circuit performs a good current equalization, and can reduce the volume of the current-equalizing transformer and decrease the cost.

21 Claims, 18 Drawing Sheets

(56) References Cited

U.S. PATENT DOCUMENTS

| | | | |
|---|---|---|---|
| 4,567,379 A | 1/1986 | Corey et al. | |
| 7,196,483 B2 | 3/2007 | Wey et al. | |
| 7,358,684 B2 | 4/2008 | Wey et al. | |
| 7,362,596 B2 | 4/2008 | Gjerde et al. | |
| 7,525,258 B2* | 4/2009 | Kim et al. | 315/282 |
| 7,567,444 B2 | 7/2009 | Chen et al. | |
| 7,667,410 B2* | 2/2010 | Kim et al. | 315/274 |
| 7,843,143 B2 | 11/2010 | Kang | |
| 8,508,157 B2* | 8/2013 | Kim et al. | 315/308 |
| 2006/0284569 A1 | 12/2006 | Wey et al. | |
| 2012/0274136 A1* | 11/2012 | Ge et al. | 307/32 |
| 2012/0286678 A1* | 11/2012 | Wu et al. | 315/188 |
| 2013/0154482 A1* | 6/2013 | Ge et al. | 315/121 |

FOREIGN PATENT DOCUMENTS

| | | |
|---|---|---|
| CN | 2385469 Y | 6/2000 |
| CN | 2777899 Y | 5/2006 |
| CN | 1832649 A | 9/2006 |
| CN | 101064475 A | 10/2007 |
| CN | 101511136 A | 8/2009 |
| CN | 101702854 A | 5/2010 |
| CN | 201585177 U | 9/2010 |
| JP | 61-124265 A | 6/1986 |
| KR | 20090018765 A | 2/2009 |
| WO | WO-2011060700 A1 | 5/2011 |
| WO | WO-2011060701 | 5/2011 |

* cited by examiner

MULTI-PATH CONSTANT CURRENT DRIVING CIRCUIT

This application is a National Stage application of PCT international application PCT/CN2010/078714 filed on Nov. 15, 2010 and titled "MULTI-PATH CONSTANT CURRENT DRIVING CIRCUIT", which claims the benefit of Chinese patent application No. 200910225966.4 filed on Nov. 21, 2009, and claims the benefit of Chinese patent application No. 200920273352.9 filed on Nov. 21, 2009. Both the PCT international application and the Chinese applications are incorporated herein by reference in their entireties.

FIELD OF THE INVENTION

The present invention relates to the field of constant-current driving technology, and in particular to a multipath constant-current driving circuit.

BACKGROUND OF THE INVENTION

Currently, the most common solution to constant-current control of multipath light-emitting diodes (LEDs) includes a constant-voltage module and multiple non-isolated DC/DC constant-current modules.

FIG. 1 shows a constant-current control circuit for multipath LEDs in the prior art. In this circuit, an input voltage Vac goes through a constant-voltage module and then inputs to multiple non-isolated DC/DC constant-current modules. Each of the non-isolated DC/DC constant-current modules performs constant-current control separately. However, there is normally a significant disparity between the voltage of the constant-voltage module and the voltage of an LED load; therefore none of the non-isolated DC/DC constant-current modules that follow the constant-voltage module has a high efficiency. In addition, the structure of multiple non-isolated DC/DC constant-current modules is complex and costly.

According to the Chinese patent application No. 200810085227.5, a balanced-current power supply circuit for multiple groups of LEDs is provided. As shown in FIG. 2, a first inductor Lca1 of a coupled inductor Lca is connected in series to a Direct current (DC) loop after the rectification by diodes D1 and D2, and a second inductor Lca2 of the coupled inductor Lca is connected in series to a DC loop after the rectification by diodes D3 and D4, so that the coupled inductor Lca can balance the two LED loads. However, according to the circuit shown in FIG. 2, each of the two coils of the coupled inductor Lca is connected in series to a DC loop, causing a DC current, but the magnetizing current in the coupled inductor is unidirectional; therefore when the voltages of the two load branches are not balanced, the difference between the currents of the two load branches is large, resulting in poor current balancing. Moreover, the presence of a DC current in the coupled inductor may cause saturation of the magnetic core, which requires air gaps to be created; therefore when the inductance is large, the size of the coupled inductor is large and hence costly.

SUMMARY OF THE INVENTION

In view of this, a technical problem to be solved by the present invention is to provide a multipath constant-current driving circuit, which provides good current balancing, and can reduce the size of the current-balancing transformer and lower the cost.

Therefore, the embodiments of the present invention provide the following technical solutions.

According to an embodiment of the present invention, it is provided a multipath constant-current driving circuit, including: a DC/AC converter, a main transformer and at least two rectification and filtering units, the DC/AC converter is adapted to provide an alternating current (AC) voltage for the main transformer;

the main transformer includes at least one secondary winding with a tap, the tap divides the corresponding secondary winding into a first winding and a second winding, with a non-dotted terminal of the first winding being connected to a dotted terminal of the second winding;

each of the at least two rectification and filtering units forms a power supply loop with the secondary winding of the main transformer; each of the power supply loops includes a first rectification loop and a second rectification loop for rectification of the positive and the negative halves of an AC voltage, respectively; and the first winding and the second winding are in the first rectification loop and the second rectification loop, respectively; and a current-balancing transformer is arranged between a first power supply loop and a second power supply loop where adjacent rectification and filtering units are in; and the current-balancing transformer includes four windings in respective rectification loops included by the first power supply loop and the second power supply loop, for current balancing between the different rectification loops where the adjacent rectification and filtering units are in.

Of the four windings of the current-balancing transformer, currents in opposite directions may flow through a dotted terminal of a first winding and a dotted terminal of a second winding, currents in opposite directions may flow through the dotted terminal of the first winding and a dotted terminal of a third winding, and currents in opposite directions may flow through the dotted terminal of the third winding and a dotted terminal of the fourth winding.

The rectification and filtering unit may include a first diode, a second diode and a first capacitor; and the power supply loop may include: a dotted terminal of the first winding of the secondary winding connected to the non-dotted terminal of the first winding of the secondary winding via the first diode and the first capacitor sequentially connected in series, with an anode of the first diode being connected to the dotted terminal of the first winding of the secondary winding; and the dotted terminal of the second winding of the secondary winding connected to a non-dotted terminal of the second winding of the secondary winding via the first capacitor and the second diode sequentially connected in series, with an anode of the second diode being connected to the non-dotted terminal of the second winding of the secondary winding.

In a power supply loop where a first rectification and filtering unit is in, a first winding of the current-balancing transformer may be connected in series between the dotted terminal of the first winding of the secondary winding and the first capacitor; and a second winding of the current-balancing transformer may be connected in series between the non-dotted terminal of the second winding of the secondary winding and the first capacitor; and in a power supply loop where a second rectification and filtering unit is in, a third winding of the current-balancing transformer may be connected in series between the dotted terminal of the first winding of the secondary winding and the first capacitor; and a fourth winding of the current-balancing transformer may be connected in series between the non-dotted terminal of the second winding of the secondary winding and the first capacitor.

The rectification and filtering circuit may include: a third diode, a fourth diode, a first inductor and a second capacitor; and the power supply loop may include: a dotted terminal of the first winding of the secondary winding connected to the non-dotted terminal of the first winding of the secondary winding via the third diode, the first inductor and the second capacitor sequentially connected in series, with an anode of the third diode being connected to the dotted terminal of the first winding of the secondary winding; and the dotted terminal of the second winding of the secondary winding connected to a non-dotted terminal of the second winding of the secondary winding via the second capacitor, the first inductor and the fourth diode sequentially connected in series, with an anode of the fourth diode being connected to the non-dotted terminal of the second winding of the secondary winding.

In a power supply loop where a first rectification and filtering unit is in, a first winding of the current-balancing transformer may be connected in series between the dotted terminal of the first winding of the secondary winding and the first inductor; and a second winding of the current-balancing transformer may be connected in series between the non-dotted terminal of the second winding of the secondary winding and the first inductor; and in a power supply loop where the second rectification and filtering unit is in, a third winding of the current-balancing transformer may be connected in series between the dotted terminal of the first winding of the secondary winding and the first inductor; and a fourth winding of the current-balancing transformer may be connected in series between the non-dotted terminal of the second winding of the secondary winding and the first inductor.

The main transformer may include one primary winding and one secondary winding with a tap; and the secondary winding with the tap forms a power supply loop with each of the rectification and filtering units.

The main transformer may include one primary winding and at least two secondary windings with a tap, each of the secondary windings corresponding to a rectification and filtering unit; and each of the secondary windings forms a power supply loop with a rectification and filtering unit that corresponds to the secondary winding.

The main transformer may include at least two primary windings and at least two secondary windings with a tap, where there is a one-to-one-to-one correspondence between the primary windings, the secondary windings and rectification and filtering units; and each of the secondary windings forms a power supply loop with a rectification and filtering unit that corresponds to the secondary winding.

The DC/AC converter may be any one of a bridge circuit, a push-pull circuit, a flyback circuit, a forward circuit, a series resonant circuit, an LLC-type resonant circuit and a soft-switched circuit.

According to an embodiment of the present invention, it is also provided a multipath constant-current driving circuit, including: a DC/AC converter and a main transformer, the DC/AC converter is adapted to provide an AC voltage for the main transformer;

the main transformer includes at least one secondary winding with a tap, the tap divides the corresponding secondary winding into a first winding and a second winding, with a non-dotted terminal of the first winding being connected to a dotted terminal of the second winding; and at least one of the at least one secondary winding with a tap corresponds to a power supply loop of at least two stages;

each of the stages of the power supply loop corresponding to the secondary winding includes a first rectification loop and a second rectification loop; the first rectification loop includes: a first terminal of the first winding of the secondary winding connected to a second terminal of the first winding of the secondary winding via a rectification and filtering unit, third windings of all current-balancing transformers arranged in previous stages of the power supply loop, and a first winding of a current-balancing transformer corresponding to both the current stage of the power supply loop and the next stage of the power supply loop; and the second rectification loop includes: a first terminal of the second winding of the secondary winding connected to a second terminal of the first winding of the secondary winding via a second winding of the current-balancing transformer corresponding to both the current stage of the power supply loop and the next stage of the power supply loop, fourth windings of all the current-balancing transformers arranged in the previous stages of the power supply loop, and a rectification and filtering unit; and the current-balancing transformer includes four windings, for current balancing between different rectification loops where adjacent rectification and filtering units are in.

Of the four windings of the current-balancing transformer, currents in opposite directions may flow through a dotted terminal of the first winding and a dotted terminal of the second winding, currents in opposite directions may flow through the dotted terminals of the first winding and a dotted terminal of the third winding, and currents in opposite directions may flow through the dotted terminals of the third winding and a dotted terminal of the fourth winding.

The rectification and filtering unit may include a first diode, a second diode and a first capacitor.

The first rectification loop may include: the first terminal of the first winding of the secondary winding connected to the second terminal of the first winding of the secondary winding via the third windings of all the current-balancing transformers arranged in the previous stages of the power supply loop, the first diode, the first winding of the current-balancing transformer corresponding to both the current stage of the power supply loop and the next stage of the power supply loop, and the first capacitor sequentially; and the second rectification loop may include: the first terminal of the second winding of the secondary winding connected to the second terminal of the first winding of the secondary winding via the first capacitor, the second winding of the current-balancing transformer corresponding to both the current stage of the power supply loop and the next stage of the power supply loop, the second diode, and the fourth windings of all the current-balancing transformers arranged in the previous stages of the power supply loop sequentially.

The first rectification loop may include: the first terminal of the first winding of the secondary winding connected to the second terminal of the first winding of the secondary winding via the third windings of all the current-balancing transformers arranged in the previous stages of the power supply loop, the first winding of the current-balancing transformer corresponding to both the current stage of the power supply loop and the next stage of the power supply loop, the first diode, and the first capacitor sequentially; and the second rectification loop may include: the first terminal of the second winding of the secondary winding connected to the second terminal of the first winding of the secondary winding via the first capacitor, the second diode, the second winding of the current-balancing transformer corresponding to both the current stage of the power supply loop and the next stage of the power supply loop, and the fourth windings of all the current-balancing transformers arranged in the previous stages of the power supply loop sequentially.

The main transformer may be:

a transformer including one primary winding and one secondary winding; or a transformer including one primary winding and at least two secondary windings; or a transformer including at least two primary windings and at least two secondary windings, where there is a one-to-one correspondence between the primary windings and the secondary windings.

The DC/AC converter may be any one of a bridge circuit, a push-pull circuit, a flyback circuit, a forward circuit, a series resonant circuit, an LLC-type resonant circuit and a soft-switched circuit.

According to an embodiment of the present invention, it is also provided a multipath constant-current driving circuit, including: a DC/AC converter and a main transformer, the DC/AC converter is adapted to provide an AC voltage for the main transformer;

the main transformer includes at least one secondary winding with a tap, the tap divides the corresponding secondary winding into a first winding and a second winding, with a non-dotted terminal of the first winding being connected to a dotted terminal of the second winding; and the secondary winding of the main transformer is connected to at least two power supply branch groups, to form respective main power supply loops;

a current-balancing transformer is arranged between two adjacent main power supply loops, with a first winding and a second winding of the current-balancing transformer being arranged in one of the two main power supply loops, and a third winding and a fourth winding of the current-balancing transformer being arranged in the other one of the two main power supply loops, for current balancing between the two main power supply loops.

At least one of the two main power supply loops may include at least a power supply loop of at least two stages; each of the stages of the power supply loop may include a first rectification loop and a second rectification loop; the first rectification loop may include: a first terminal of the first winding of the corresponding secondary winding connected to a second terminal of the first winding of the secondary winding via a rectification and filtering unit, third windings of all current-balancing transformers arranged in previous stages of the power supply loop, and a first winding of the current-balancing transformer corresponding to both the current stage of the power supply loop and the next stage of the power supply loop; the second rectification loop may include: a first terminal of the second winding of the secondary winding connected to the second terminal of the first winding of the secondary winding via a second winding of the current-balancing transformer corresponding to both the current stage of the power supply loop and the next stage of the power supply loop, fourth windings of all current-balancing transformers arranged in the previous stages of the power supply loop, and a rectification and filtering unit; and the current-balancing transformer may include four windings, for current balancing between different rectification loops where adjacent rectification and filtering units are in.

At least one of the two main power supply loops may include at least two power supply loops; each of the power supply loops may include a rectification and filtering unit and a corresponding secondary winding of the main transformer, forming a first rectification loop and a second rectification loop; the first winding and the second winding of the corresponding secondary winding may be in the first rectification loop and the second rectification loop, respectively; the first rectification loop and the second rectification loop are for rectification of the positive and the negative halves of an AC voltage; a current-balancing transformer may be arranged between a first power supply loop and a second power supply loop where adjacent rectification and filtering units are in; and the current-balancing transformer may include four windings in respective rectification loops included by the first power supply loop and the second power supply loop, for current balancing between the different rectification loops where the adjacent rectification and filtering units are in.

Technical effects of the technical solutions above are discussed below.

The first winding and the second winding (or, the third winding and the fourth winding) of the current-balancing transformer are in two different rectification loops for the positive and the negative halves of the AC voltage respectively, with currents in opposite directions flowing through their dotted terminals; hence it is equivalently that a bidirectional AC current flows through the windings of the current-balancing transformer. Therefore there is no DC current in the current-balancing transformer, which eliminates the need for air gaps in the current-balancing transformer, allows large inductance at a small size, provides good current balancing, and lowers the cost.

DETAILED DESCRIPTION OF THE INVENTION

According to an embodiment of the present invention, it is provided a multipath constant-current driving circuit, including: a DC/AC converter, a main transformer and at least two rectification and filtering units, the DC/AC converter is adapted to provide an alternating current (AC) voltage for the main transformer; the main transformer includes at least one secondary winding with a tap, the tap divides the corresponding secondary winding into a first winding and a second winding, with a non-dotted terminal of the first winding being connected to a dotted terminal of the second winding;

each of the at least two rectification and filtering units forms a power supply loop with the secondary winding of the main transformer; each of the power supply loops includes a first rectification loop and a second rectification loop for rectification of the positive and the negative halves of an AC voltage, respectively; and the first winding and the second winding are in the first rectification loop and the second rectification loop, respectively; and a current-balancing transformer is arranged between a first power supply loop and a second power supply loop where adjacent rectification and filtering units are in; and the current-balancing transformer includes four windings in respective rectification loops included by the first power supply loop and the second power supply loop, for current balancing between the different rectification loops where the adjacent rectification and filtering units are in.

Of the four windings of the current-balancing transformer, currents in opposite directions flow through a dotted terminal of a first winding and a dotted terminal of a second winding, currents in opposite directions flow through the dotted terminal of the first winding and a dotted terminal of a third winding, and currents in opposite directions flow through the dotted terminal of the third winding and a dotted terminal of the fourth winding.

The main transformer may be implemented to include one primary winding and one secondary winding; or, one primary winding and at least two secondary windings; or, at least two primary windings and at least two secondary windings; or the like.

The DC/AC converter may be implemented to be any one of a bridge circuit, a push-pull circuit, a flyback circuit, a forward circuit, a series resonant circuit, an LLC-type resonant circuit and a soft-switched circuit.

Implementation of the multipath constant-current driving circuits according to the embodiments of the present invention will be described hereinafter in detail in conjunction with the accompanying drawings.

Figure 1:
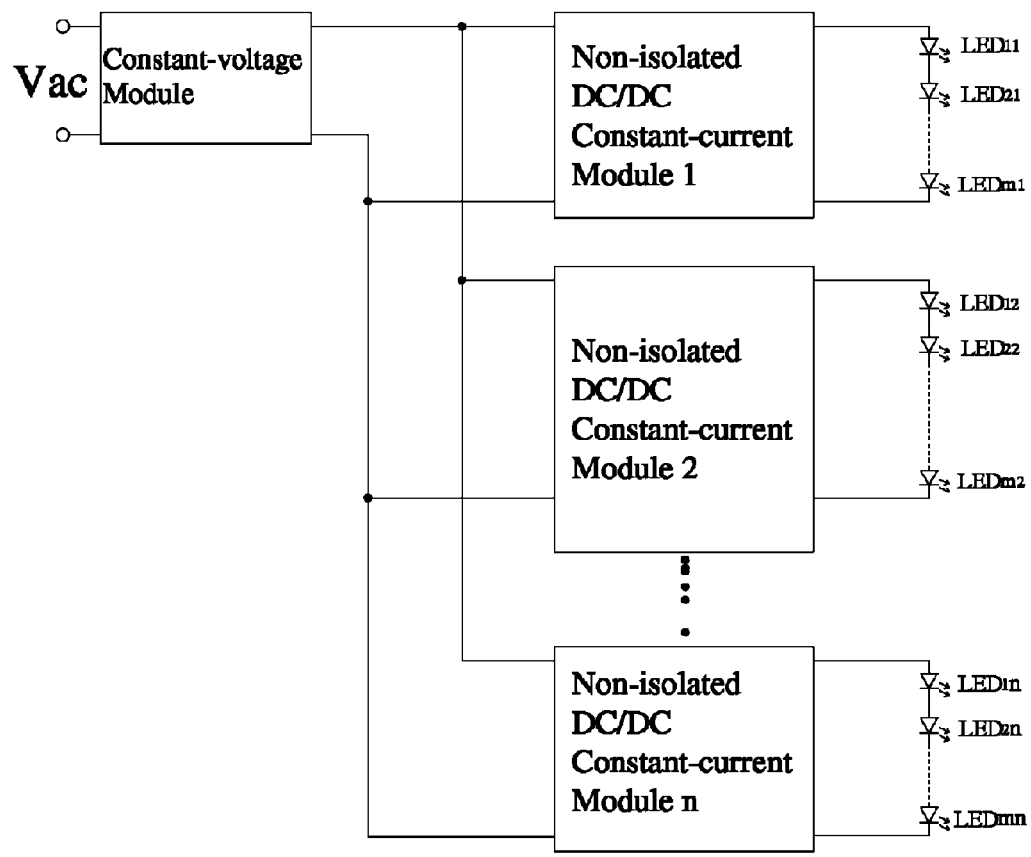
FIG. 1 is a structural diagram illustrating an LED constant-current control circuit in the prior art.
Figure 2:
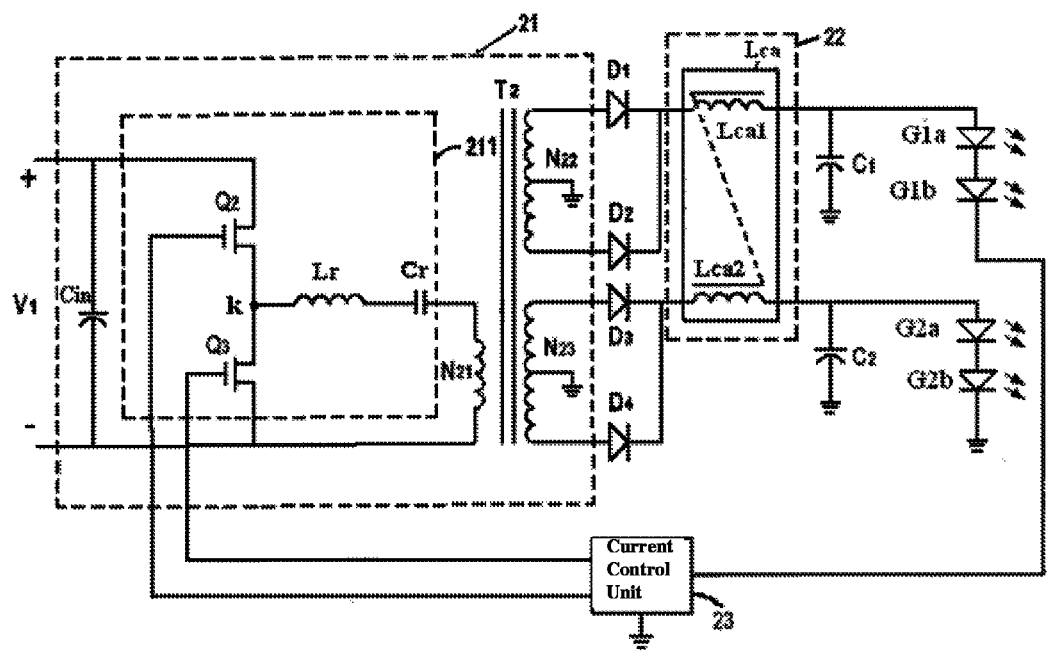
FIG. 2 illustrates a balanced-current power supply circuit for multiple groups of LEDs in the prior art.
Figure 3:
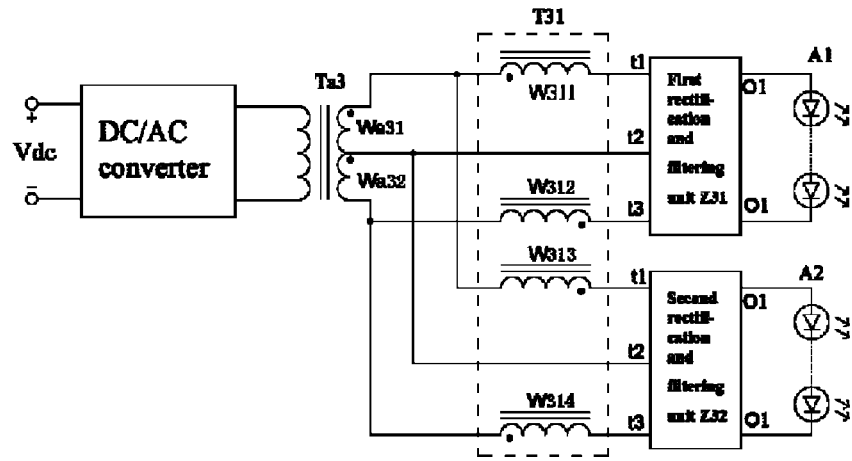
FIGS. 3 to 3b are structural diagrams illustrating a two-path constant-current driving circuit according to the present invention.

FIG. 3 is a structural diagram illustrating a multipath constant-current driving circuit according to an embodiment of the present invention. As shown in FIG. 3, the multipath constant-current driving circuit includes: a DC/AC converter, a main transformer Ta3, a first rectification and filtering unit Z31, and a second rectification and filtering unit Z32. The electrical energy output by the first rectification and filtering unit Z31 and the second rectification and filtering unit Z32 is supplied to the loads such as an LED.

The main transformer Ta3 includes one primary winding and one secondary winding with a tap. The tap divides the secondary winding into a first winding Wa31 and a second winding Wa32, and a non-dotted terminal of the first winding Wa31 is connected to a dotted terminal of the second winding Wa32.

The secondary winding forms a power supply loop with each of the first rectification and filtering unit Z31 and the second rectification and filtering unit Z32. Specifically, the dotted terminal of the first winding Wa31 of the secondary winding is connected to a first input terminal t1 of the first rectification and filtering unit Z31, the non-dotted terminal of the first winding Wa31 of the secondary winding is connected to a second input terminal t2 of the first rectification and filtering unit Z31, and the non-dotted terminal of the second winding Wa32 of the secondary winding is connected to a third input terminal t3 of the first rectification and filtering unit Z31. The connections between the second rectification and filtering unit Z32 and the secondary winding are similar to that between the first rectification and filtering unit Z31 and the secondary winding, which are therefore omitted here.

A current-balancing transformer T31 includes four winds, i.e., a first winding W311, a second winding W312, a third winding W313 and a fourth winding W314. Currents in opposite directions flow through the dotted terminal of the first winding W311 and the dotted terminal of the second winding W312; currents in opposite directions flow through the dotted terminal of the third winding W313 and the dotted terminal of the fourth winding W314; and currents in opposite directions flow through the dotted terminal of the first winding W311 and the dotted terminal of the third winding W313.

The first winding W311 and the second winding W312 are in the power supply loop where the first rectification and filtering unit Z31 is in; and the third winding W313 and the fourth winding W314 are in the power supply loop where the second rectification and filtering unit Z32 is in. Specifically, the first winding W311 is connected in series between the dotted terminal of the first winding Wa31 of the secondary winding of the main transformer Ta3 and the first input terminal t1 of the first rectification and filtering unit Z31; the second winding W312 is connected in series between the non-dotted terminal of the second winding Wa32 of the secondary winding of the main transformer Ta3 and the third input terminal t3 of the first rectification and filtering unit Z31; the third winding W313 is connected in series between the dotted terminal of the first winding Wa31 of the secondary winding of the main transformer Ta3 and the first input terminal t1 of the second rectification and filtering unit Z32; and the fourth winding W314 is connected in series between the non-dotted terminal of the second winding Wa32 of the secondary winding of the main transformer Ta3 and the third input terminal t3 of the second rectification and filtering unit Z32.

In each of the power supply loops formed by a rectification and filtering unit and the secondary winding, two rectification loops are included, for rectification of the positive and the negative halves of the AC voltage, respectively.

Figure 3A:
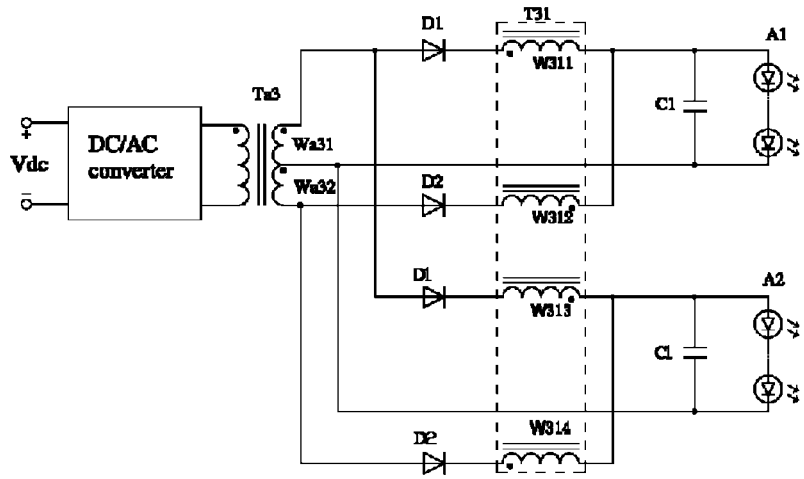

For example, as shown in FIG. 3a, the rectification and filtering unit may include: a first diode D1, a second diode D2 and a first capacitor C1.

Each power supply loop includes: the dotted terminal of the first winding Wa31 of the secondary winding connected to the non-dotted terminal of the first winding Wa31 via the first diode D1 and the first capacitor C1 sequentially connected in series, with the anode of the first diode D1 being connected to the dotted terminal of the first winding Wa31 of the secondary winding; and the dotted terminal of the second winding Wa32 of the secondary winding connected to the non-dotted terminal of the second winding Wa32 via the first capacitor C1 and the second diode D2 sequentially connected in series, with the anode of the second diode D2 being connected to the non-dotted terminal of the second winding Wa32 of the secondary winding.

The first winding of the secondary winding, the first diode D1 and the first capacitor C1 form a first rectification loop; and the second winding of the secondary winding, the second diode D2 and the first capacitor C1 form a second rectification loop. The positive and the negative halves of the AC power flow through the two rectification loops, respectively.

Therefore, the first winding W311 of the current-balancing transformer T31 is in the first rectification loop corresponding to the first rectification and filtering unit Z31; the second winding W312 of the current-balancing transformer T31 is in the second rectification loop corresponding to the first rectification and filtering unit Z31; the third winding W313 of the current-balancing transformer T31 is in the first rectification loop corresponding to the second rectification and filtering unit Z32; and the fourth winding W311 of the current-balancing transformer T31 is in the second rectification loop corresponding to the second rectification and filtering unit Z32.

Figure 3B:
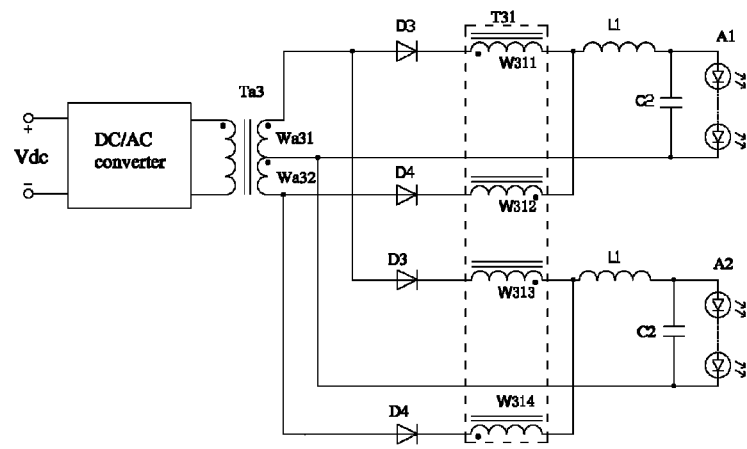

Alternatively, as shown in FIG. 3b, the rectification and filtering unit may include: a third diode D3, a fourth diode D4, a first inductor L1 and a second capacitor C2.

Each power supply loop includes: the dotted terminal of the first winding W311 of the secondary winding connected to the non-dotted terminal of the first winding W311 via the third diode D3, the first inductor L1 and the second capacitor C2 sequentially connected in series, with the anode of the third diode D3 being connected to the dotted terminal of the first winding W311 of the secondary winding; and the dotted terminal of the second winding W312 of the secondary winding connected to the non-dotted terminal of the second winding W312 via the second capacitor C2, the first inductor L1 and the fourth diode D4 sequentially connected in series, with the anode of the fourth diode D4 being connected to the non-dotted terminal of the second winding W312 of the secondary winding.

Then, the first winding of the secondary winding, the third diode D3, the first inductor L1 and the second capacitor C2 form a first rectification loop; and the second winding of the secondary winding, the fourth diode D4, the first inductor L1 and the second capacitor C2 form a second rectification loop. The positive and the negative halves of the AC power flow through the two rectification loops, respectively.

Therefore, the first winding W311 of the current-balancing transformer T31 is in the first rectification loop corresponding to the first rectification and filtering unit Z31; the second winding W312 of the current-balancing transformer T31 is in the second rectification loop corresponding to the first rectification and filtering unit Z31; the third winding W313 of the current-balancing transformer T31 is in the first rectification loop corresponding to the second rectification and filtering unit Z32; and the fourth winding W311 of the current-balancing transformer T31 is in the second rectification loop corresponding to the second rectification and filtering unit Z32.

Specifically, the operating principle of the current-balancing transformer T31 is described below. Output currents iw311 and iw312 flow through the dotted terminal of the winding W311 of the current-balancing transformer at the positive half of the AC voltage and the non-dotted terminal of the winding W312 of the current-balancing transformer at the negative half of the AC voltage, respectively; and W311=W312. Output currents iw313 and iw314 flow through the non-dotted terminal of the winding W313 of the current-balancing transformer at the positive half of the AC voltage and the dotted terminal of the winding W314 of the current-balancing transformer at the negative half of the AC voltage, respectively; and W313=W314.

When the turns ratio of the current-balancing transformer is W311:W313=1:1, if load currents I1 and I2 are unbalanced because of unbalanced voltages across respective LED loads A1 and A2, the currents flowing through the dotted terminals and the non-dotted terminals of the current-balancing transformer T31 are not equal in magnitude; hence the magnetizing current in the current-balancing transformer is not zero. The magnetizing current generates an AC voltage across the windings of the current-balancing transformer, which automatically balances the difference between the voltages across respective LED loads, so that the currents iw311, iw312, iw313 and iw314 in the current-balancing transformer are balanced, thereby realizing balancing between the load currents (I1 and I2).

When the turns ratio of the current-balancing transformer is W311:W313=n:m, if the voltages across respective LED loads A1 and A2 are unbalanced, the magnetizing current in the current-balancing transformer is not zero. The magnetizing current generates an AC voltage across the windings of the current-balancing transformer, which automatically balances the difference between the voltages across respective loads, so that the ratio of the current iw311 (iw312) to the current iw313 (iw314) is m:n, thereby realizing control of multiple load currents.

The current-balancing transformer in fact balances only the AC components of the load currents, but does not affect the DC components. The greater the inductance of the current-balancing transformer, the better the current balancing between the two loads.

Based on the analysis above, in the multipath constant-current driving circuit shown in FIG. 3 to FIG. 3b, the first winding and the second winding (or, the third winding and the fourth winding) of the current-balancing transformer are in two different rectification loops for the positive and the negative halves of the AC power supply respectively, with currents in opposite directions flowing through their dotted terminals; hence it is equivalently that a bidirectional AC current flows through the windings of the current-balancing transformer. Therefore there is no DC component in the current-balancing transformer, which eliminates the need for air gaps in the current-balancing transformer, allows large inductance at a small size, provides good current balancing, and lowers the cost. Moreover, when such a circuit is applied to the case where the AC signal is a square wave having a duty cycle of approximately 50%, almost no efficiency is lost; and when the difference between output voltages is large (or even short-circuited), there is no additional stress or peaks to the rectifier, thereby improving the reliability of the device, lowering the cost of the device, and providing better electromagnetic interference (EMI) performance.

Figure 4:
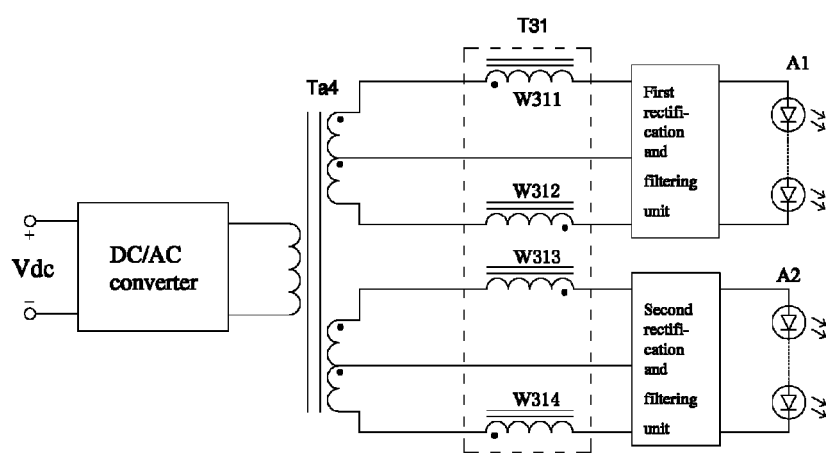
FIGS. 4 to 4b are structural diagrams illustrating another two-path constant-current driving circuit according to the present invention.
Figure 4A:
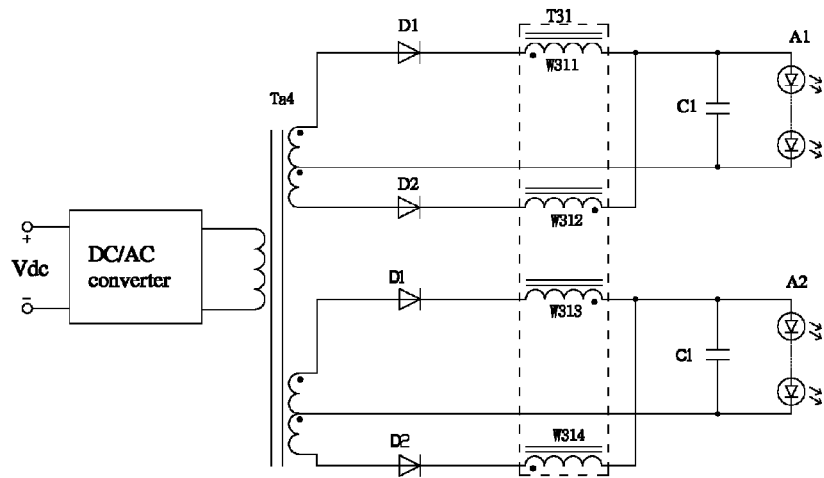
Figure 4B:
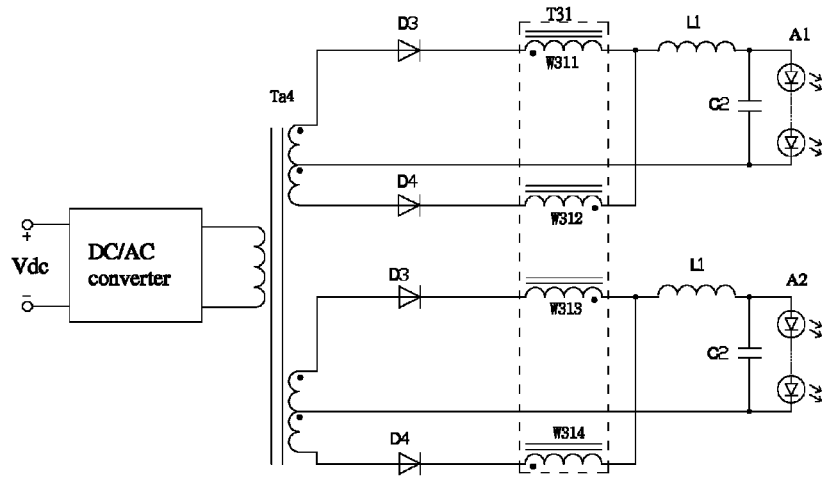

In the multipath constant-current driving circuit shown in FIG. 3 to FIG. 3b, the main transformer includes one primary winding and one secondary winding, and the secondary winding forms a power supply loop with each rectification and filtering unit. In practice, the main transformer may include one primary winding and at least two secondary windings. Then, each of the secondary windings corresponds to a rectification and filtering unit, and forms a power supply loop with the corresponding rectification and filtering unit. In this case, the circuit structure shown in FIG. 3 turns into the circuit structure shown in FIG. 4. The only difference between FIG. 4 and FIG. 3 lies in the structure of the main transformer, which results in the difference between the power supply loops formed. Similarly, FIG. 4a and FIG. 4b show implementation structures of a multipath constant-current driving circuit according to the present invention with different rectification and filtering units. FIG. 4a and FIG. 4b correspond to FIG. 3a and FIG. 3b, respectively. The differences are also the structure of the main transformer, which are therefore omitted here.

Figure 5:
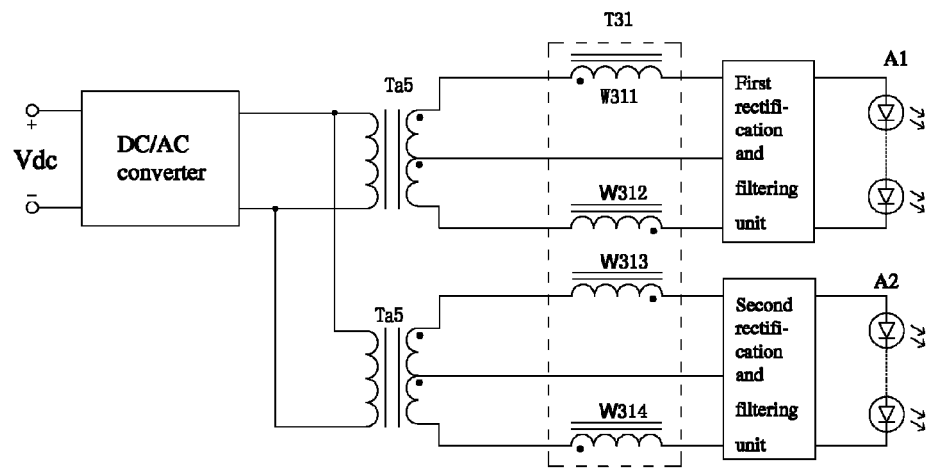
FIGS. 5 to 5b are structural diagrams illustrating a third type of two-path constant-current driving circuit according to the present invention.
Figure 5A:
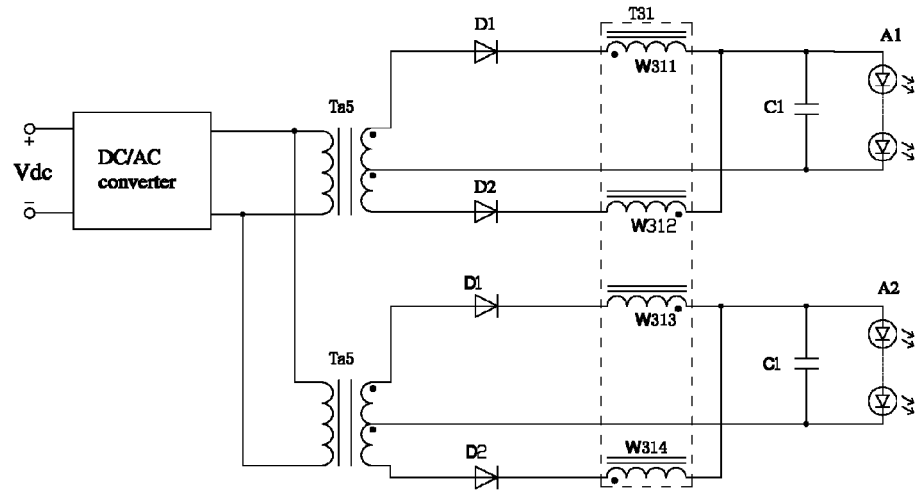
Figure 5B:
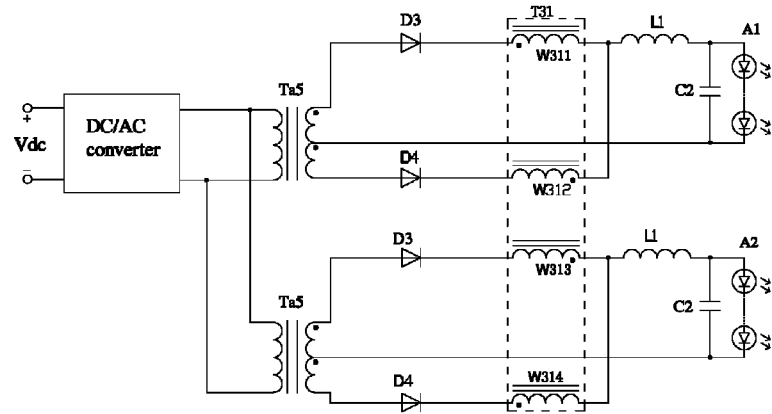
Figure 6A:
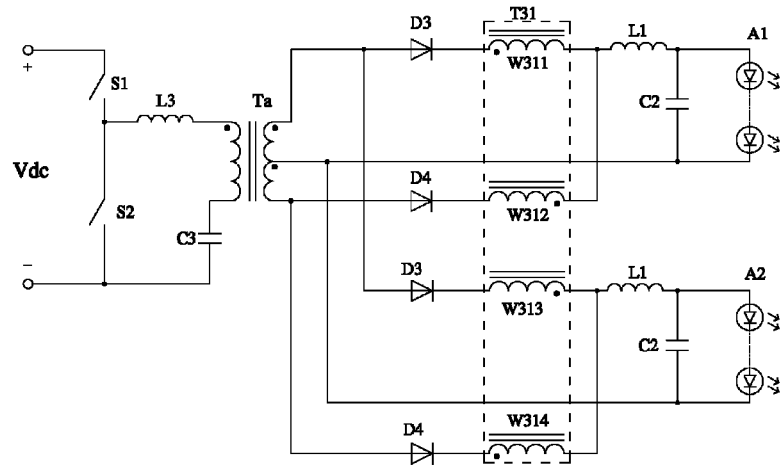
FIGS. 6a to 6e are structural diagrams illustrating a two-path constant-current driving circuit with different DC/AC converters according to the present invention.
Figure 6B:
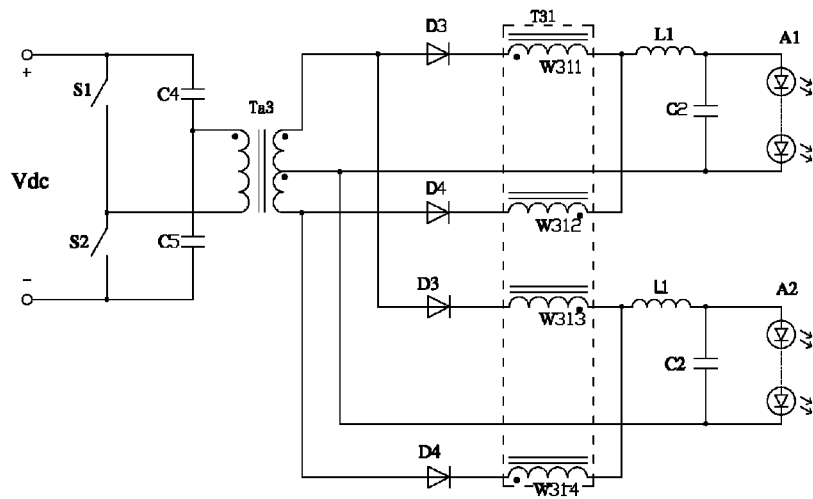
Figure 6C:
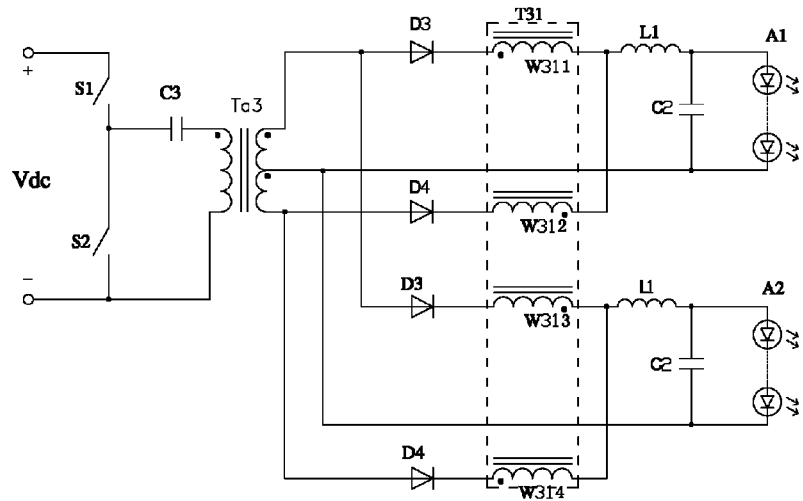
Figure 6D:
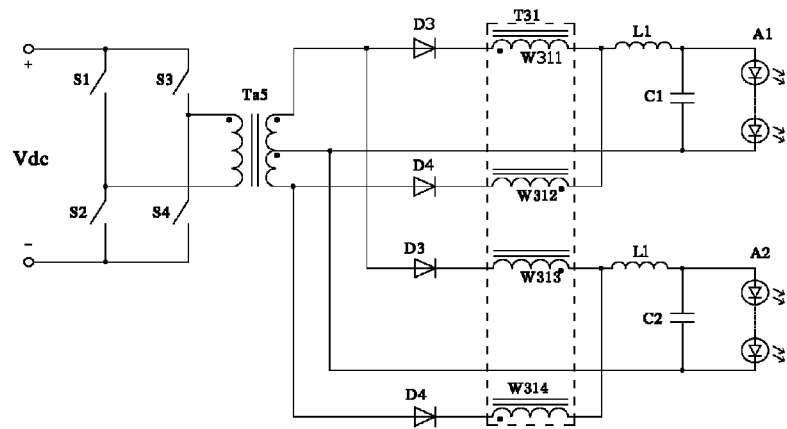
Figure 6E:
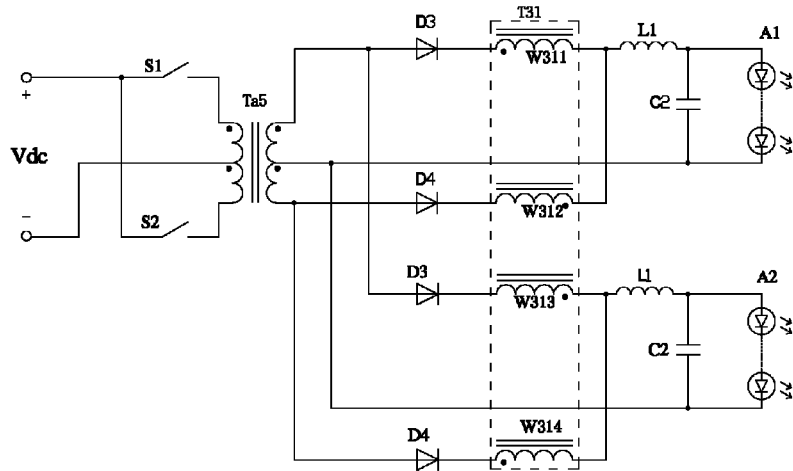

Alternatively, in the multipath constant-current driving circuit shown in FIG. 3 to FIG. 3b, the main transformer may include at least two primary windings and at least two secondary windings, and there is a one-to-one-to-one correspondence between the primary windings, the secondary windings and rectification and filtering units. Then, each of the secondary windings corresponds to a rectification and filtering unit, and forms a power supply loop with the corresponding rectification and filtering unit. In this case, the circuit structure show in FIG. 3 turns into the circuit structure shown in FIG. 5. The only difference between FIG. 5 and FIG. 3 lies in the structure of the main transformer, which results in the difference between the power supply loops formed. Similarly, FIG. 5a and FIG. 5b show implementation structures of a multipath constant-current driving circuit according to the present invention with different rectification and filtering units. FIG. 5a and FIG. 5b correspond to FIG. 3a and FIG. 3b, respectively. The differences are also the structure of the main transformer, which are therefore omitted here.

Furthermore, the implementation of the DC/AC converter is not limited according to the present invention, which may be any one of a bridge circuit, a push-pull circuit, a flyback circuit, a forward circuit, a series resonant circuit, an LLC-type resonant circuit and a soft-switched circuit. For example, in the implementation structure of a multipath constant-current driving circuit according to the present invention shown in FIG. 6a to FIG. 6e, the DC/AC converter is implemented as an LLC resonant circuit, a symmetric half-bridge circuit, an asymmetric half-bridge circuit, a full-bridge circuit and a push-pull circuit, respectively.

Figure 7A:
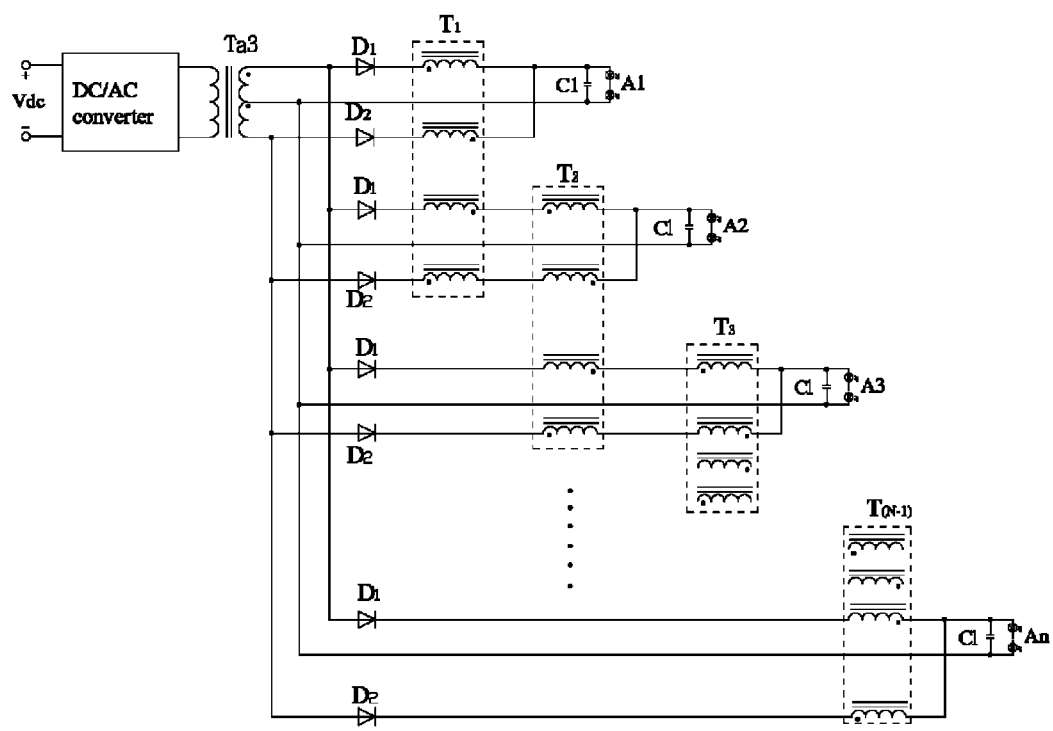
FIGS. 7a to 7c are structural diagrams illustrating a multi-path constant-current driving circuit according to the present invention.
Figure 7B:
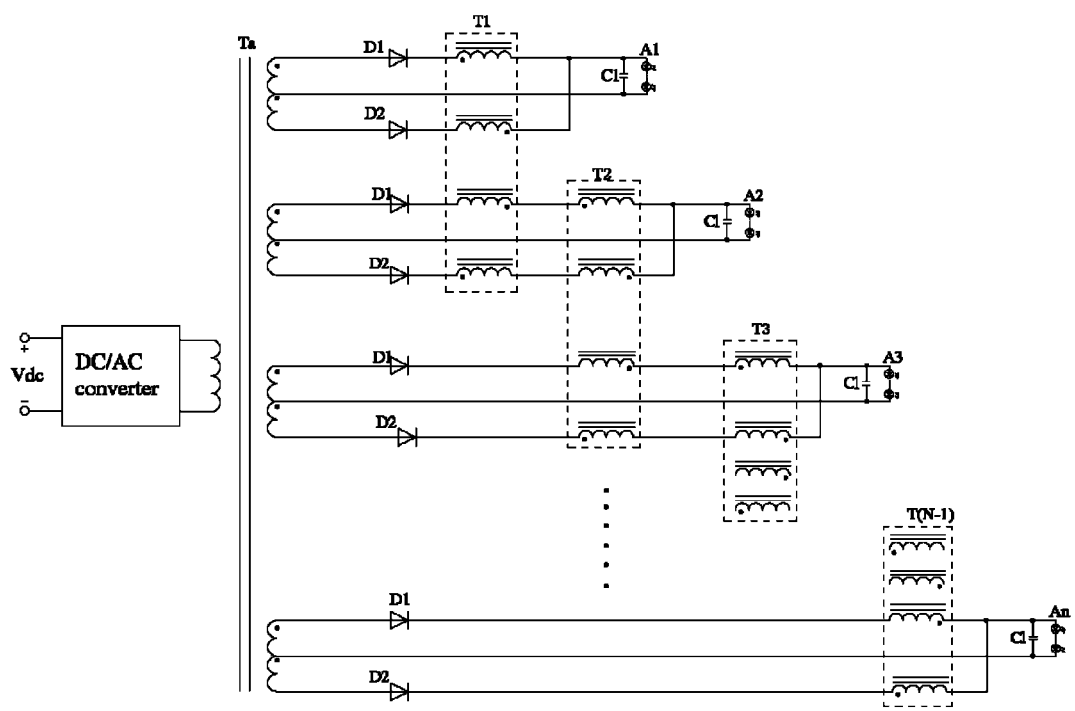
Figure 7C:
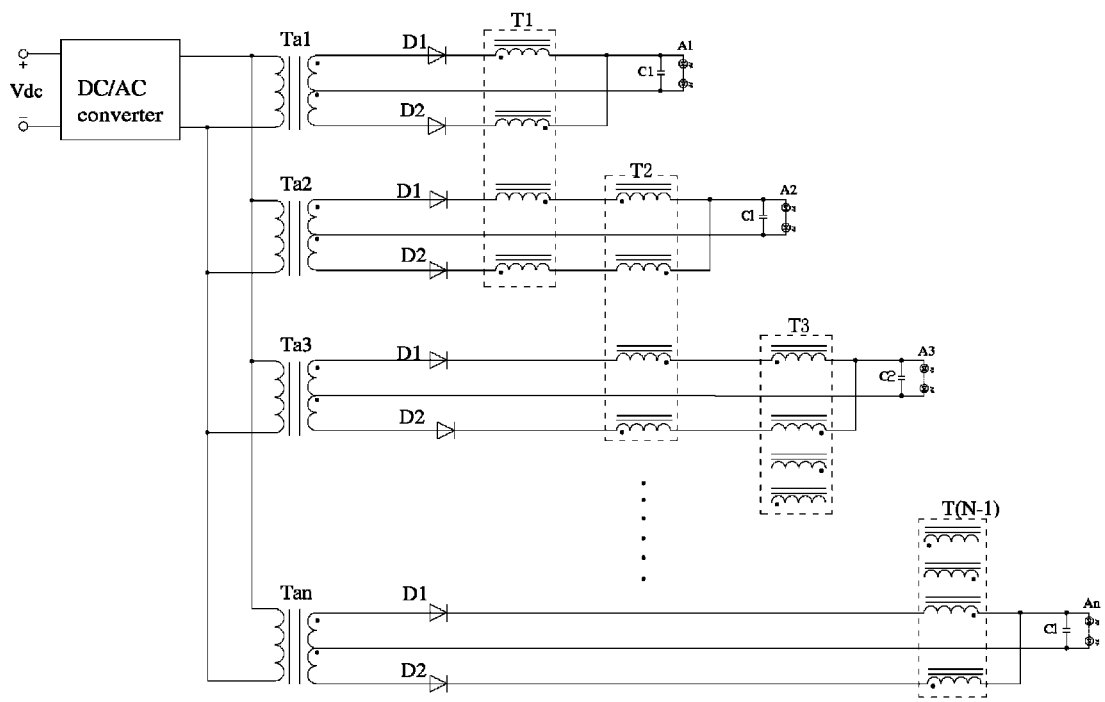

The multipath constant-current driving circuits shown above include two paths. In a practical application, more than two paths may be included, which is illustrated by FIG. 7a to FIG. 7c, corresponding to FIG. 3a, FIG. 4a and FIG. 5a, respectively.

Figure 8A:
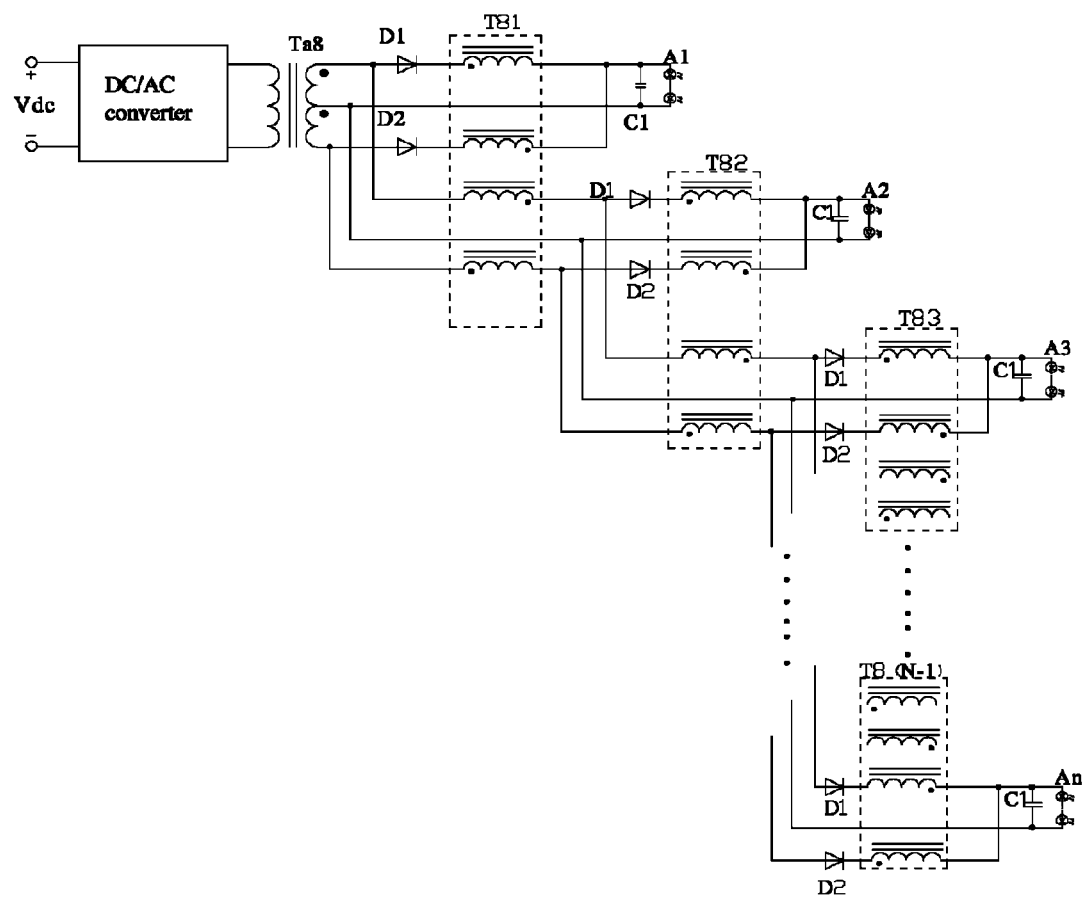
FIG. 8a is a structural diagram illustrating a fourth type of multipath constant-current driving circuit according to the present invention.

As shown in FIG. 8a, according to an embodiment of the present invention, it is also provided a multipath constant-current driving circuit, including: a DC/AC converter and a main transformer, the DC/AC converter is adapted to provide an AC voltage for the main transformer;

the main transformer includes at least one secondary winding with a tap, the tap divides the corresponding secondary winding into a first winding and a second winding, with a non-dotted terminal of the first winding being connected to a dotted terminal of the second winding; and of the at least one secondary winding of the main transformer, there is at least one secondary winding that corresponds to a power supply loop of at least two stages;

each of the stages of the power supply loop corresponding to the secondary winding includes a first rectification loop and a second rectification loop; the first rectification loop includes: a first terminal of the first winding of the secondary winding connected to a second terminal of the first winding of the secondary winding via a rectification and filtering unit, third windings of all current-balancing transformers arranged in previous stages of the power supply loop, and a first winding of a current-balancing transformer corresponding to both the current stage of the power supply loop and the next stage of the power supply loop; and the second rectification loop includes: a first terminal of the second winding of the secondary winding connected to a second terminal of the first winding of the secondary winding via a second winding of the current-balancing transformer corresponding to both the current stage of the power supply loop and the next stage of the power supply loop, fourth windings of all the current-balancing transformers arranged in the previous stages of the power supply loop, and a rectification and filtering unit; and the current-balancing transformer includes four windings, for current balancing between different rectification loops where adjacent rectification and filtering units are in.

Of the four windings of the current-balancing transformer, currents in opposite directions may flow through a dotted terminal of the first winding and a dotted terminal of the second winding, currents in opposite directions may flow through the dotted terminals of the first winding and a dotted terminal of the third winding, and currents in opposite directions may flow through the dotted terminals of the third winding and a dotted terminal of the fourth winding.

As shown in FIG. 8a, the rectification and filtering unit may include a first diode D1, a second diode D2 and a first capacitor C1.

Specifically, as shown in FIG. 8a, the secondary winding corresponds to a multi-stage power supply loop, and each of the stages of the power supply loop includes a first rectification loop and a second rectification loop.

In FIG. 8a, the first rectification loop includes: the first terminal of the first winding of the secondary winding connected to the second terminal of the first winding of the secondary winding via the first diode D1, third windings of all current-balancing transformers arranged in previous stages of the power supply loop, a first winding of the current-balancing transformer corresponding to both the current stage of the power supply loop and the next stage of the power supply loop, and the first capacitor C1 sequentially; and the second rectification loop includes: the first terminal of the second winding of the secondary winding connected to the second terminal of the first winding of the secondary winding via the first capacitor C1, a second winding of the current-balancing transformer corresponding to both the current stage of the power supply loop and the next stage of the power supply loop, and fourth windings of all the current-balancing transformers arranged in the previous stages of the power supply loop, and the second diode D2 sequentially.

Alternatively, in each power supply loop, the first rectification loop may include: the first terminal of the first winding of the secondary winding connected to the second terminal of the first winding of the secondary winding via third windings of all current-balancing transformers arranged in previous stages of the power supply loop, a first winding of the current-balancing transformer corresponding to both the current stage of the power supply loop and the next stage of the power supply loop, the first diode, and the first capacitor sequentially; and the second rectification loop may include: the first terminal of the second winding of the secondary winding connected to the second terminal of the first winding of the secondary winding via the first capacitor, the second diode, a second winding of the current-balancing transformer corresponding to both the current stage of the power supply loop and the next stage of the power supply loop, and fourth windings of all the current-balancing transformers arranged in the previous stages of the power supply loop sequentially.

Therefore, the (N−1)th current-balancing transformer balances the total current of the previous N−2 loads and the current of the last load, thereby realizing current balancing between the N loads.

For example, in FIG. 8a, for the (N−1)th stage of the power supply loop, its first rectification loop includes: the first terminal of the first winding of the secondary winding connected to the second terminal of the first winding of the secondary winding via the first diode D1, third windings of the current-balancing transformers T81 to T8(N−2), a first winding of the current-balancing transformer T8(N−1), and the first capacitor C1 sequentially; and the second rectification loop includes: the first terminal of the second winding of the secondary winding connected to the second terminal of the first winding of the secondary winding via the first capacitor C1, a second winding of the current-balancing transformer T8(N−1), fourth windings of the current-balancing transformers T8(N−2) to T81, and the second diode D2 sequentially.

For the Nth stage of the power supply loop, its first rectification loop includes: the first terminal of the first winding of the secondary winding connected to the second terminal of the first winding of the secondary winding via the first diode D1, third windings of the current-balancing transformers T81 to T8(N−1), and the first capacitor C1 sequentially; and the second rectification loop includes: the first terminal of the second winding of the secondary winding connected to the second terminal of the first winding of the secondary winding via the first capacitor C1, fourth windings of the current-balancing transformers T8(N−1) to T81, and the second diode D2 sequentially.

In this case, the Nth stage of the power supply loop is not followed by another stage; hence the Nth stage of the power supply loop does not include the first winding and the second winding of the current-balancing transformer.

Moreover, in FIG. 8a, the main transformer is a transformer including one primary winding and one secondary winding. In a practical application, the main transformer may also be a transformer including one primary winding and at least two secondary windings; or, a transformer including at least two primary windings and at least two secondary windings, where there is a one-to-one correspondence between the primary windings and the secondary windings. In these cases, each of the secondary windings of the main transformer may correspond to a multi-stage power supply loop similar to that shown in FIG. 8a.

In the technical solution above, of all the secondary windings of the main transformer, each secondary winding may correspond to a power supply loop of at least two stages; alternatively, each secondary winding may correspond to multiple power supply loops of at least two stages, which implementation may also achieve the multipath constant-current driving circuit according the present invention.

Alternatively, each of some (at least one) of all the secondary windings may correspond to a power supply loop of at least two stages, while the other secondary windings form a power supply loop use a circuit structure in the prior art for supplying electric power to the loads, thereby realizing current balancing, or, using any of the various power supply loops described in conjunction with FIG. 3 to FIG. 7 for supplying electric power to the loads, thereby realizing current balancing. The present invention is not limited to any specific implementation.

For example, the circuit structures shown in FIG. 8a and FIG. 7a may be combined to the same multipath constant-current driving circuit.

For the driving circuit shown in FIG. 7a, all the power supply branches (the number of which is set to be M, where M>=2) that are connected to the secondary winding and are connected in parallel to each other to form the constant-current driving circuit can be seen as a first power supply branch group; and for the driving circuit shown in FIG. 8a, all the power supply branches that are connected to the secondary winding and form the multi-stage constant-current driving circuit can be seen as a second power supply branch group.

Figure 9A:
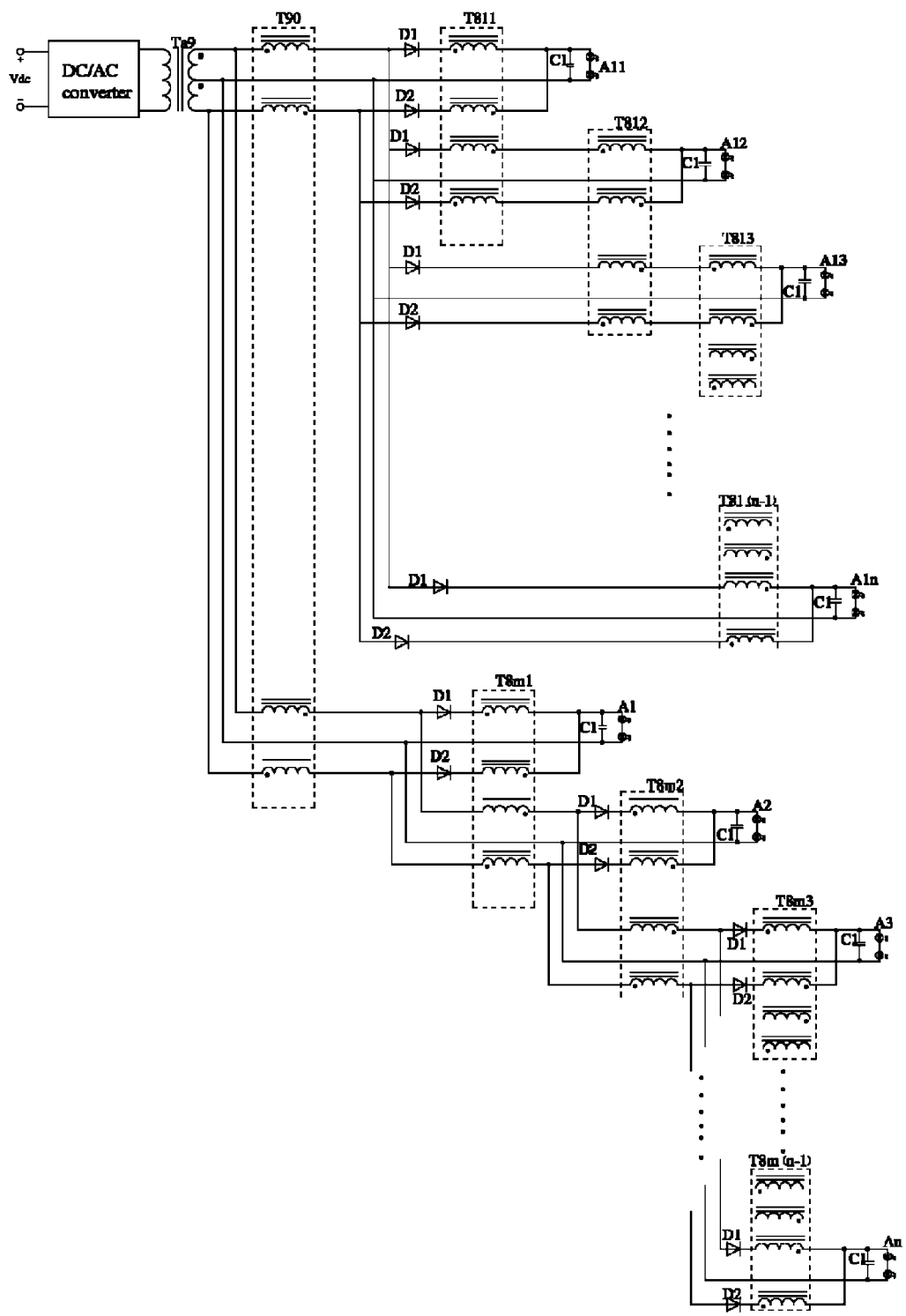
FIGS. 9a to 9e are structural diagrams illustrating a fifth type of multipath constant-current driving circuit according to the present invention.

Then, as shown in FIG. 9a, the main transformer includes one primary winding and one secondary winding. The input terminals of the first power supply branch group and the second power supply branch group are connected to the two terminals of the secondary winding of the main transformer, respectively. That is, the first power supply branch group and the second power supply branch group are connected in parallel to the same secondary winding. The power supply loop formed by the first power supply branch group connected to the secondary winding can be seen as a first main power supply loop, and the power supply loop formed by the second power supply branch group connected to the secondary winding can be seen as a second main power supply loop. In this case, in order to balance the total current Im of the first main power supply loop and the total current In of the second main power supply loop, a current-balancing transformer T90 may be arranged between the two main power supply loops, with its first winding and second winding arranged between the secondary winding and the input terminals of the first power supply branch group in the first main power supply loop, and its third winding and fourth winding arranged between the secondary winding and the input terminals of the second power supply branch group in the second main power supply loop.

Figure 9B:
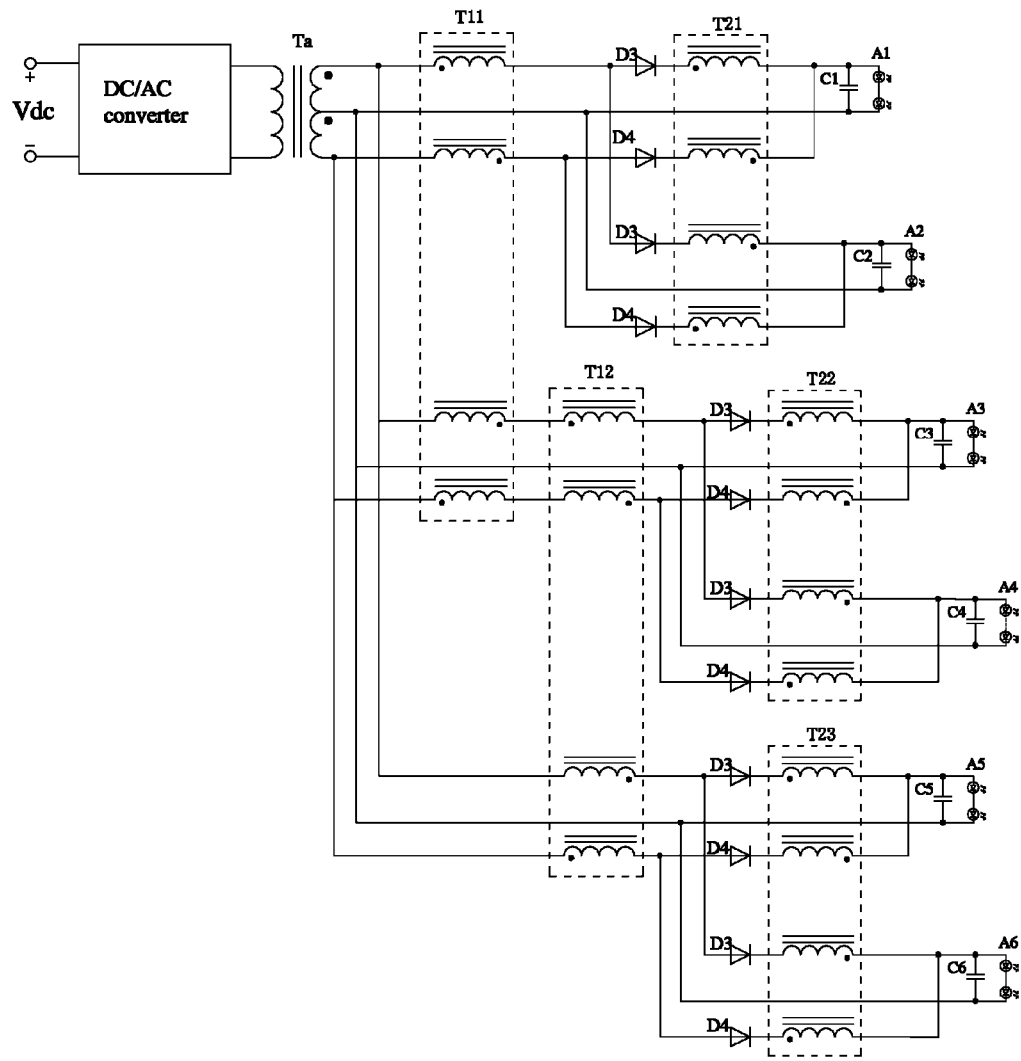
Figure 9C:
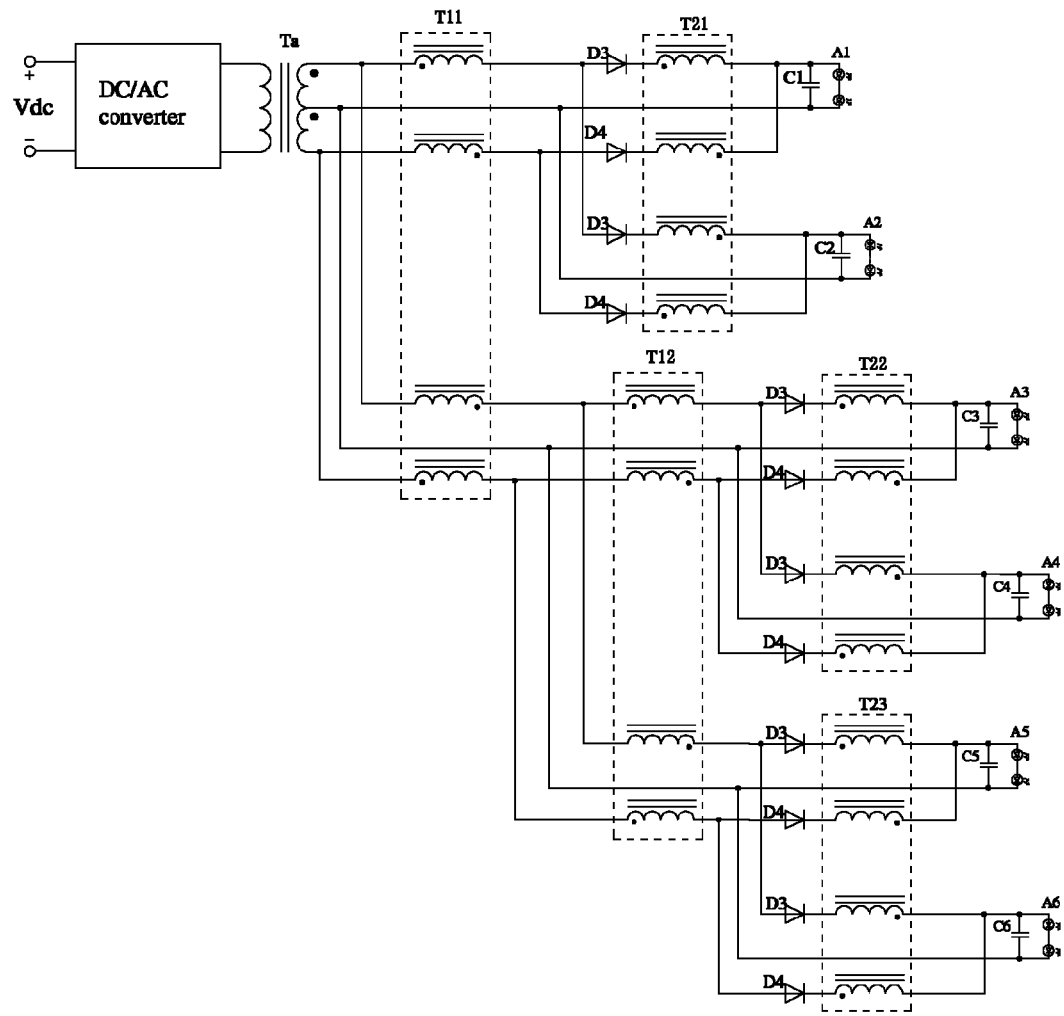
Figure 9D:
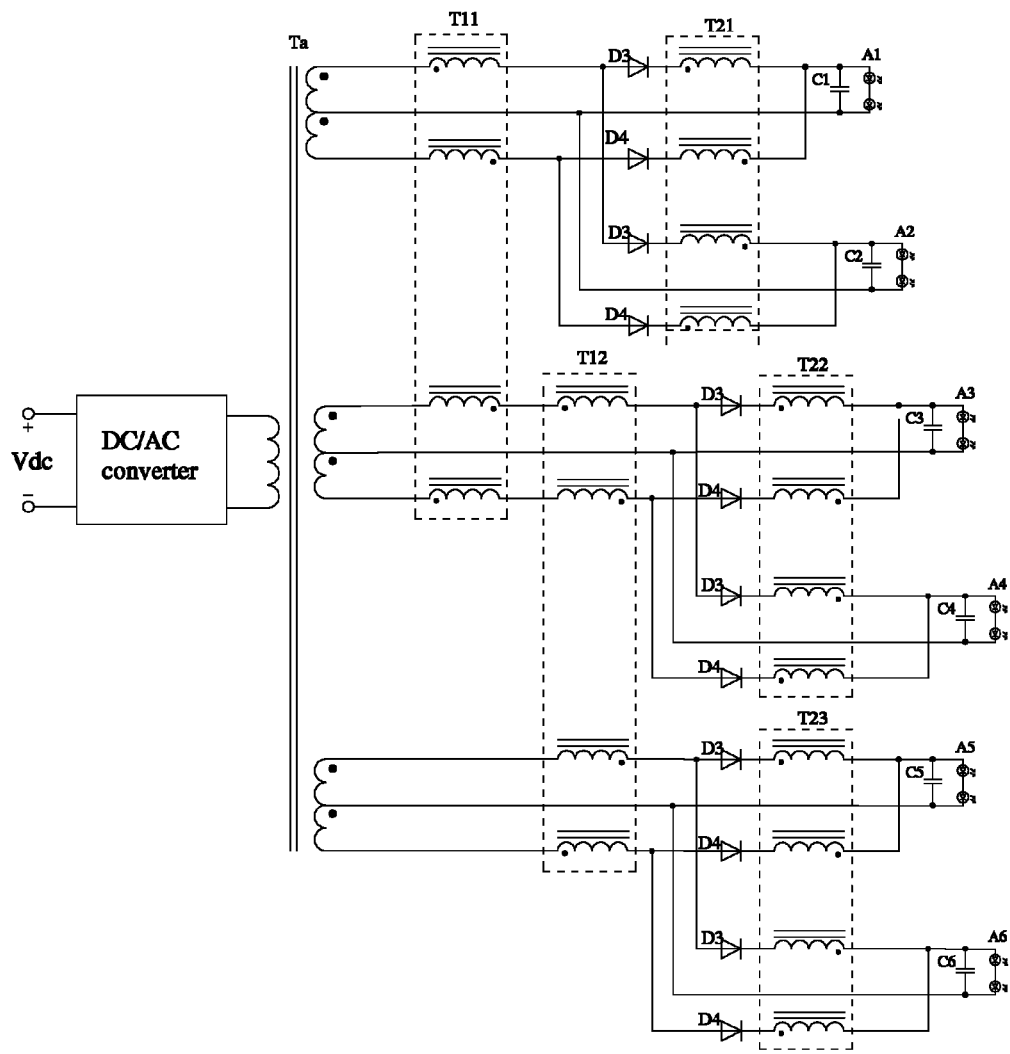
Figure 9E:
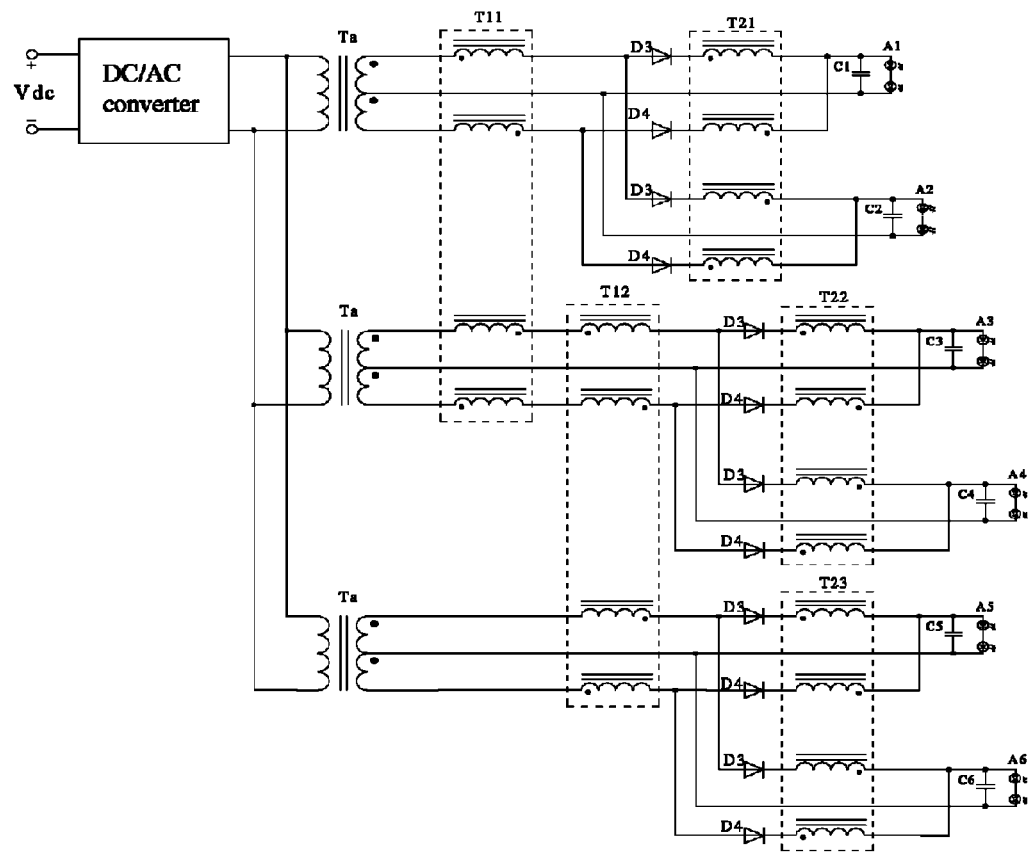

Correspondingly, such a circuit can be extended to various cases where the multipath constant-current driving circuit according to the present invention includes at least one first power supply branch group and at least one second power supply branch group, or where the multipath constant-current driving circuit according to the present invention includes at least two first power supply branch groups and at least two second power supply branch groups. For example, as shown in FIG. 9b to FIG. 9c, the circuit shown in FIG. 9a can also be extended to the cases where the main transformer includes one primary winding and multiple secondary windings, and where the main transformer includes multiple primary windings and multiple secondary windings, which are shown in FIGS. 9d to 9e, respectively.

In addition, the DC/AC converter in the embodiment may be any one of a bridge circuit, a push-pull circuit, a flyback circuit, a forward circuit, a series resonant circuit, an LLC-type resonant circuit and a soft-switched circuit, which are illustrated by FIG. 6a to FIG. 6e and are therefore omitted here.

Preferred embodiments of the present invention are described above for illustrative purposes only. It should be noted that modifications and alternations may be made by those skilled in the art without deviation from the scope of the present invention. These modifications and alternations shall fall within the scope of protection of the present invention.

What is claimed is:

1. A multipath constant-current driving circuit, comprising: a DC/AC converter, a main transformer and at least two rectification and filtering units, wherein,
   the DC/AC converter is adapted to provide an alternating current (AC) voltage for the main transformer;
   the main transformer comprises at least one secondary winding with a tap, the tap divides the corresponding secondary winding into a first winding and a second winding, with a non-dotted terminal of the first winding being connected to a dotted terminal of the second winding;
   each of the at least two rectification and filtering units forms a power supply loop with the secondary winding of the main transformer; each of the power supply loops comprises a first rectification loop and a second rectification loop for rectification of the positive and the negative halves of an AC voltage output from the main transformer, respectively; and the first winding and the second winding are in the first rectification loop and the second rectification loop, respectively; and
   a current-balancing transformer is arranged between two adjacent power supply loops; and the current-balancing transformer comprises four windings in respective rectification loops comprised by the first power supply loop and the second power supply loop, for current balancing between the different rectification loops where the adjacent rectification and filtering units are in.

2. The circuit according to claim 1, wherein,
   of the four windings of the current-balancing transformer, currents in opposite directions flow through a dotted terminal of a first winding and a dotted terminal of a second winding, currents in opposite directions flow through the dotted terminal of the first winding and a dotted terminal of a third winding, and currents in opposite directions flow through the dotted terminal of the third winding and a dotted terminal of the fourth winding.

3. The circuit according to claim 1, wherein, the rectification and filtering unit comprises a first diode, a second diode and a first capacitor; and the power supply loop comprises: a dotted terminal of the first winding of the secondary winding connected to the non-dotted terminal of the first winding of the secondary winding via the first diode and the first capacitor sequentially connected in series, with an anode of the first diode being connected to the dotted terminal of the first winding of the secondary winding; and the dotted terminal of the second winding of the secondary winding connected to a non-dotted terminal of the second winding of the secondary winding via the first capacitor and the second diode sequentially connected in series, with an anode of the second diode being connected to the non-dotted terminal of the second winding of the secondary winding.

4. The circuit according to claim 3, wherein,
in a power supply loop where a first rectification and filtering unit is in, a first winding of the current-balancing transformer is connected in series between the dotted terminal of the first winding of the secondary winding and the first capacitor; and a second winding of the current-balancing transformer is connected in series between the non-dotted terminal of the second winding of the secondary winding and the first capacitor; and
in a power supply loop where a second rectification and filtering unit is in, a third winding of the current-balancing transformer is connected in series between the dotted terminal of the first winding of the secondary winding and the first capacitor; and a fourth winding of the current-balancing transformer is connected in series between the non-dotted terminal of the second winding of the secondary winding and the first capacitor.

5. The circuit according to claim 1, wherein, the rectification and filtering circuit comprises: a third diode, a fourth diode, a first inductor and a second capacitor; and the power supply loop comprises: a dotted terminal of the first winding of the secondary winding connected to the non-dotted terminal of the first winding of the secondary winding via the third diode, the first inductor and the second capacitor sequentially connected in series, with an anode of the third diode being connected to the dotted terminal of the first winding of the secondary winding; and the dotted terminal of the second winding of the secondary winding connected to a non-dotted terminal of the second winding of the secondary winding via the second capacitor, the first inductor and the fourth diode sequentially connected in series, with an anode of the fourth diode being connected to the non-dotted terminal of the second winding of the secondary winding.

6. The circuit according to claim 5, wherein,
in a power supply loop where a first rectification and filtering unit is in, a first winding of the current-balancing transformer is connected in series between the dotted terminal of the first winding of the secondary winding and the first inductor; and a second winding of the current-balancing transformer is connected in series between the non-dotted terminal of the second winding of the secondary winding and the first inductor; and in a power supply loop where the second rectification and filtering unit is in, a third winding of the current-balancing transformer is connected in series between the dotted terminal of the first winding of the secondary winding and the first inductor; and a fourth winding of the current-balancing transformer is connected in series between the non-dotted terminal of the second winding of the secondary winding and the first inductor.

7. The circuit according to claim 1, wherein, the main transformer comprises one primary winding and one secondary winding with a tap; and
the secondary winding with the tap forms a power supply loop with each of the rectification and filtering units.

8. The circuit according to claim 1, wherein, the main transformer comprises one primary winding and at least two secondary windings with a tap, each of the secondary windings corresponding to a rectification and filtering unit; and
each of the secondary windings forms a power supply loop with a rectification and filtering unit that corresponds to the secondary winding.

9. The circuit according to claim 1, wherein, the main transformer comprises at least two primary windings and at least two secondary windings with a tap, where there is a one-to-one-to-one correspondence between the primary windings, the secondary windings and rectification and filtering units; and
each of the secondary windings forms a power supply loop with a rectification and filtering unit that corresponds to the secondary winding.

10. The circuit according to claim 1, wherein, the DC/AC converter is any one of a bridge circuit, a push-pull circuit, a series resonant circuit, and an LLC-type resonant circuit and a soft switched circuit.

11. The circuit according to claim 1, wherein, the main transformer comprises at least two independent transformers, each of the two independent transformers comprises at least one primary winding and at least one secondary winding with a tap, each of all secondary windings corresponds to a rectification and filtering unit; and
each of all secondary windings forms a power supply loop with a rectification and filtering unit that corresponds to the secondary winding.

12. A multipath constant-current driving circuit, comprising: a DC/AC converter and a main transformer, wherein,
the DC/AC converter is adapted to provide an AC voltage for the main transformer;
the main transformer comprises at least one secondary winding with a tap, the tap divides the corresponding secondary winding into a first winding and a second winding, with a non-dotted terminal of the first winding being connected to a dotted terminal of the second winding; and at least one of the at least one secondary winding with a tap corresponds to a power supply loop of at least two stages;
each of the stages of the power supply loop corresponding to the secondary winding comprises a first rectification loop and a second rectification loop; the first rectification loop comprises: a first terminal of the first winding of the secondary winding connected to a second terminal of the first winding of the secondary winding via a rectification and filtering unit, third windings of all current-balancing transformers arranged in previous stages of the power supply loop, and a first winding of a current-balancing transformer corresponding to both the current stage of the power supply loop and the next stage of the power supply loop; and the second rectification loop comprises: a first terminal of the second winding of the secondary winding connected to a second terminal of the second winding of the secondary winding via a second winding of the current-balancing transformer corresponding to both the current stage of the power supply loop and the next stage of the power supply loop, fourth windings of all the current-balancing transformers arranged in the previous stages of the power supply loop, and a rectification and filtering unit; and the current-balancing transformer comprises four windings, for current balancing between different rectification loops where adjacent rectification and filtering units are in.

13. The circuit according to claim 12, wherein, of the four windings of the current-balancing transformer, currents in opposite directions flow through a dotted terminal of the first winding and a dotted terminal of the second winding, currents in opposite directions flow through the dotted terminals of the first winding and a dotted terminal of the third winding, and currents in opposite directions flow through the dotted terminals of the third winding and a dotted terminal of the fourth winding.

14. The circuit according to claim 12, wherein, the rectification and filtering unit comprises a first diode, a second diode and a first capacitor.

15. The circuit according to claim 14, wherein, the first rectification loop comprises: the first terminal of the first winding of the secondary winding connected to the second terminal of the first winding of the secondary winding via the third windings of all the current-balancing transformers arranged in the previous stages of the power supply loop, the first diode, the first winding of the current-balancing transformer corresponding to both the current stage of the power supply loop and the next stage of the power supply loop, and the first capacitor sequentially; and the second rectification loop comprises: the first terminal of the second winding of the secondary winding connected to the second terminal of the second winding of the secondary winding via the first capacitor, the second winding of the current-balancing transformer corresponding to both the current stage of the power supply loop and the next stage of the power supply loop, the second diode, and the fourth windings of all the current-balancing transformers arranged in the previous stages of the power supply loop sequentially.

16. The circuit according to claim 14, wherein, the first rectification loop comprises: the first terminal of the first winding of the secondary winding connected to the second terminal of the first winding of the secondary winding via the third windings of all the current-balancing transformers arranged in the previous stages of the power supply loop, the first winding of the current-balancing transformer corresponding to both the current stage of the power supply loop and the next stage of the power supply loop, the first diode, and the first capacitor sequentially; and the second rectification loop comprises: the first terminal of the second winding of the secondary winding connected to the second terminal of the second winding of the secondary winding via the first capacitor, the second diode, the second winding of the current-balancing transformer corresponding to both the current stage of the power supply loop and the next stage of the power supply loop, and the fourth windings of all the current-balancing transformers arranged in the previous stages of the power supply loop sequentially.

17. The circuit according to claim 12, wherein, the main transformer is:
a transformer comprising one primary winding and one secondary winding; or
a transformer comprising one primary winding and at least two secondary windings; or
a transformer comprising at least two primary windings and at least two secondary windings, where there is a one-to-one correspondence between the primary windings and the secondary windings.

18. The circuit according to claim 12, wherein, the DC/AC converter is any one of a bridge circuit, a push-pull circuit, a series resonant circuit, and an LLC-type resonant circuit.

19. A multipath constant-current driving circuit, comprising: a DC/AC converter and a main transformer, wherein,
the DC/AC converter is adapted to provide an AC voltage for the main transformer;
the main transformer comprises at least one secondary winding with a tap, the tap divides the corresponding secondary winding into a first winding and a second winding, with a non-dotted terminal of the first winding being connected to a dotted terminal of the second winding; and the secondary winding of the main transformer is connected to at least two power supply branch groups, to form respective main power supply loops;
a current-balancing transformer is arranged between two adjacent main power supply loops, with a first winding and a second winding of the current-balancing transformer being arranged in one of the two main power supply loops, and a third winding and a fourth winding of the current-balancing transformer being arranged in the other one of the two main power supply loops, for current balancing between the two main power supply loops.

20. The circuit according to claim 19, wherein, at least one of the two main power supply loops comprises at least a power supply loop of at least two stages; each of the stages of the power supply loop comprises a first rectification loop and a second rectification loop; the first rectification loop comprises: a first terminal of the first winding of the corresponding secondary winding connected to a second terminal of the first winding of the secondary winding via a rectification and filtering unit, third windings of all current-balancing transformers arranged in previous stages of the power supply loop, and a first winding of the current-balancing transformer corresponding to both the current stage of the power supply loop and the next stage of the power supply loop; the second rectification loop comprises: a first terminal of the second winding of the secondary winding connected to the second terminal of the second winding of the secondary winding via a second winding of the current-balancing transformer corresponding to both the current stage of the power supply loop and the next stage of the power supply loop, fourth windings of all current-balancing transformers arranged in the previous stages of the power supply loop, and a rectification and filtering unit; and the current-balancing transformer comprises four windings, for current balancing between different rectification loops where adjacent rectification and filtering units are in.

21. The circuit according to claim 19, wherein at least one of the two main power supply loops comprises at least two power supply loops; each of the power supply loops comprises a rectification and filtering unit and a corresponding secondary winding of the main transformer, forming a first rectification loop and a second rectification loop; the first winding and the second winding of the corresponding secondary winding are in the first rectification loop and the second rectification loop, respectively; the first rectification loop and the second rectification loop are for rectification of the positive and the negative halves of an AC voltage output from the main transformer; a current-balancing transformer is arranged between a first power supply loop and a second power supply loop where adjacent rectification and filtering units are in; and the current-balancing transformer comprises four windings in respective rectification loops comprised by the first power supply loop and the second power supply loop, for current balancing between the different rectification loops where the adjacent rectification and filtering units are in.

* * * * *